United States Patent
Vallentin

(10) Patent No.: US 7,753,444 B2
(45) Date of Patent: Jul. 13, 2010

(54) CHILD SEAT

(75) Inventor: Michael Vallentin, Offenbach (DE)

(73) Assignee: Honda Motor Co., Ltd., Tokyo (JP)

( * ) Notice: Subject to any disclaimer, the term of this patent is extended or adjusted under 35 U.S.C. 154(b) by 95 days.

(21) Appl. No.: 12/053,821

(22) Filed: Mar. 24, 2008

(65) Prior Publication Data

US 2008/0252122 A1 Oct. 16, 2008

(30) Foreign Application Priority Data

Apr. 12, 2007 (DE) .................. 10 2007 017 352

(51) Int. Cl.
*A47D 1/08* (2006.01)
(52) U.S. Cl. .................. 297/256.12; 297/256.14; 297/344.21; 297/344.22
(58) Field of Classification Search .......... 297/250.1, 297/256.12, 256.14, 344.21, 344.22
See application file for complete search history.

(56) References Cited

U.S. PATENT DOCUMENTS

| | | | | |
|---|---|---|---|---|
| 2,148,187 A * | 2/1939 | Burnham | .................. | 248/425 |
| 2,472,349 A * | 6/1949 | Smith | .................. | 248/425 |
| 3,013,837 A * | 12/1961 | Pessl et al. | .................. | 296/68.1 |
| 4,417,715 A * | 11/1983 | Edwards | .................. | 248/425 |
| 6,027,170 A * | 2/2000 | Benz et al. | .................. | 297/344.21 |
| 6,241,314 B1 * | 6/2001 | Pufall | .................. | 297/256.12 |
| 6,260,920 B1 * | 7/2001 | Tolfsen | .................. | 297/256.16 |
| 6,283,545 B1 * | 9/2001 | Ernst | .................. | 297/256.16 |
| 6,520,579 B2 * | 2/2003 | Kassai et al. | .................. | 297/256.12 |
| 6,773,065 B1 * | 8/2004 | Stamper | .................. | 297/256.12 |
| 6,938,954 B1 * | 9/2005 | Hendren et al. | .................. | 297/256.12 |
| 6,981,746 B2 * | 1/2006 | Chung et al. | .................. | 297/344.21 |
| 7,029,069 B2 * | 4/2006 | Hendren et al. | .................. | 297/256.12 |
| 7,036,883 B1 * | 5/2006 | Thompson et al. | .................. | 297/344.24 |
| 2001/0008349 A1 * | 7/2001 | Yamazaki | .................. | 297/250.1 |
| 2006/0170262 A1 * | 8/2006 | Gold et al. | .................. | 297/256.12 |

* cited by examiner

*Primary Examiner*—David Dunn
*Assistant Examiner*—James Alex
(74) *Attorney, Agent, or Firm*—Rankin, Hill & Clark LLP

(57) ABSTRACT

A child seat attached to a vehicle seat comprises a base platform which is attached on the vehicle seat and comprises a guide groove; and a child seat body which comprises a bottom face and a guided member which is fixed on the bottom face. The guided member being slidably engaged with the guide groove. The guide groove comprises a curved portion. The child seat can turn to a substantially lateral direction to a moving direction of a vehicle by the guided member being guided along the curved portion.

11 Claims, 7 Drawing Sheets

CHILD SEAT

BACKGROUND OF THE INVENTION

1. Field of the Invention

The present invention relates to a child seat which is placed on a vehicle seat such as a car seat.

2. Description of the Related Art

Conventionally, a seat belt for adults of a vehicle does not fit an infant. Therefore, when an infant is put on a vehicle, a child seat is placed on a vehicle seat, an infant is put on the child seat, and the body of the infant is fastened with a seat belt of the child seat to keep the infant safely secured.

For easily putting an infant on and getting him/her out of a vehicle, a child seat which turns in almost a horizontal plane (hereinafter simply referred to "horizontal plane") on a seat of a vehicle has been developed. For example, Japanese Unexamined Patent Application, Publication No. JP2002-127794 discloses the technology.

In the technology of the above patent document, the child seat is fixed on a turning plate which is installed on the base plate and turns horizontally. However, there are problems with this type of the child seat that the turning of the child seat is not stable, devices such as a balance weight is necessary, a structure becomes complicated, and a production cost rises.

Therefore, it would be desirable to provide a child seat that is simple constitution and can turn to a lateral direction stably.

SUMMARY OF THE INVENTION

In one aspect of the present invention, there is provided a child seat (CS) attached to a vehicle seat (3) comprising:

a base platform (2) which is attached on the vehicle seat (10) and comprises a guide groove (21); and a child seat body (1) which comprises a bottom face (15) and a guided member (12, 13 or 14) which is fixed on the bottom face (15), the guided member (12, 13 or 14) being slidably engaged with the guide groove (21), wherein the guide groove (21) comprises a curved portion (21*l*, 21*r*), the child seat (CS) can turn to a substantially lateral direction to a moving direction of the vehicle by the guided member (12, 13 or 14) being guided along the curved portion (21*l*, 21*r*).

DETAILED DESCRIPTION OF THE EXEMPLARY EMBODIMENTS

Embodiments of the present invention will be described below in detail with reference to the accompanying drawings. In the following description, terms "front (forward)" and "rear" mean respective sides relative to the vehicle body, and terms "left" and "right" mean respective sides relative to the vehicle body when seen from a forward-facing driver/passenger.

First Embodiment

Figure 1:
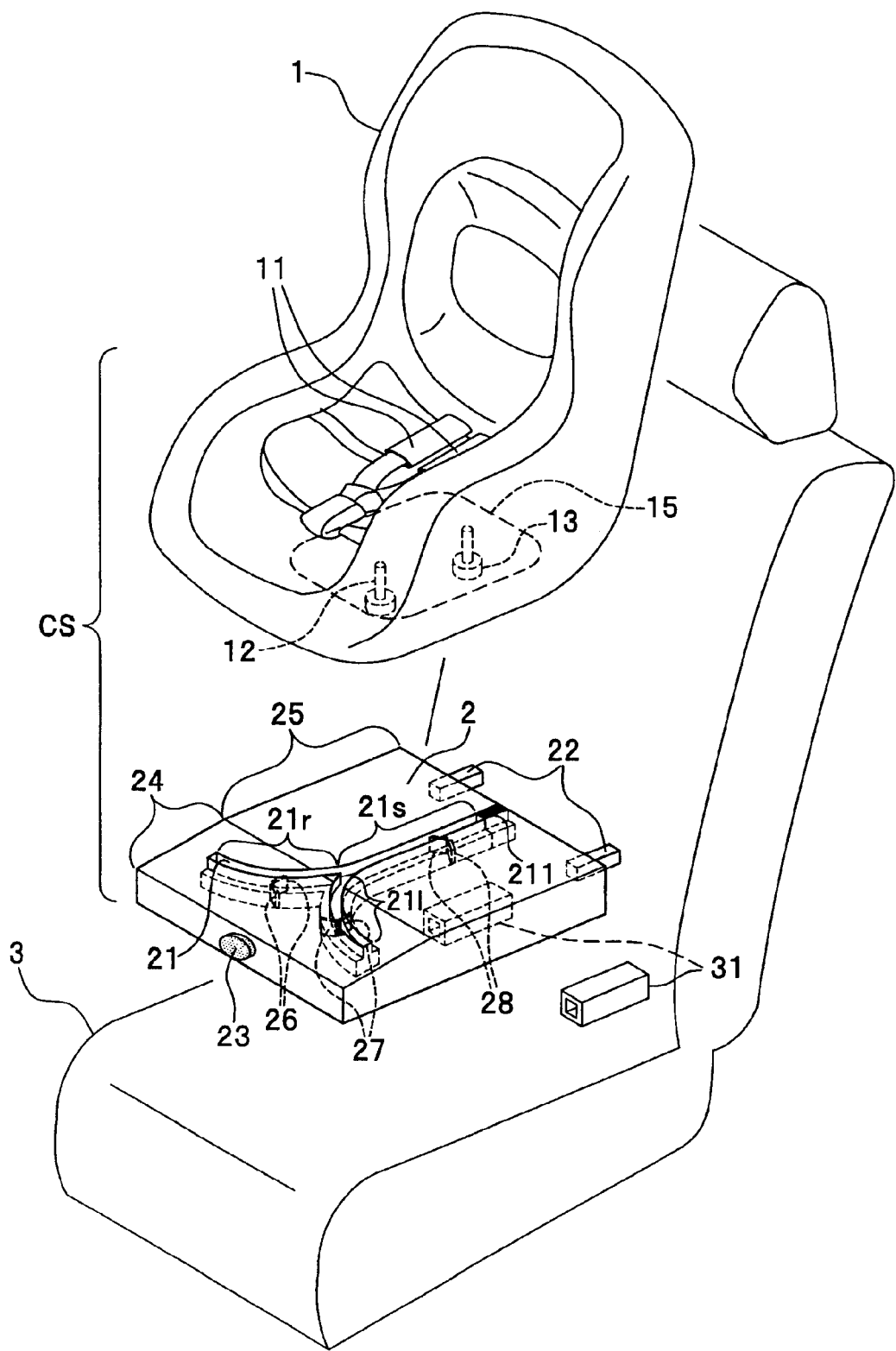
FIG. 1 is an exploded perspective view of an entire configuration including a child seat according to the first embodiment.

FIG. 1 is an exploded perspective view of an entire configuration including a child seat according to the first embodiment. The child seat CS comprises a child seat body 1 and a base platform 2. A vehicle seat 3 is, for example a rear seat (only a part is shown) of a car. The vehicle seat 3 has two female engagement parts 31 to fix the base platform 2. There are two female engagement parts 31, but only one of them may be mentioned in the following description, since the structure of the child seat CS is symmetrical. Likewise, for other paired components in symmetrical relation, only one of them may be mentioned. In FIG. 1, a left near side front is "front (forward)", and a right far side is "rear (backward)".

The child seat body 1 comprises seat belts 11 on a sitting part. The child seat body 1 further comprises a front guided member 12 and a rear guided member 13 arranged along a centerline of a bottom face 15 which is nearly flat. For example, the front guided member 12 and the rear guided member 13 are installed on the bottom face 15 of the child seat body 1 by press-fitting or screws. Alternatively, a member including the bottom face 15 with the front guided member 12 and the rear guided member 13 provided thereon may be produced separately from the child seat body 1, and the member may be installed to the child seat body 1 with screws and the like.

The seat belts 11 are used to secure a body of a sitting infant to the child seat body 1. When the child seat body 1 is fixed on the base platform 2, the bottom face 15 of the child seat body 1 is brought into tight contact with the base platform 2. When the child seat body 1 slidably moves on the base platform 2, the bottom face 15 of the child seat body 1 is brought into slight contact with the base platform 2.

The front guided member 12 is in a shape of a combination of a column and a disk attached to a bottom of the column, in other words, has a perpendicular section in a shape of reversed T. When the front guided member 12 is fitted in a guide groove 21 formed in the base platform 2, the front guided member 12 becomes slidable along the guide groove 21.

The rear guided member 13 has a similar shape to the front guided member 12. Likewise, when the rear guided member 13 is fitted in the guide groove 21, the rear guided member 13 becomes slidable along the guide groove 21.

The base platform 2 comprises the guide groove 21, a stopper 211, two male engagement parts 22, a lock release button 23, and lock members 26-28 (locking mechanism). In addition, the base platform 2 is formed of a parallel portion 25 and a tapered portion 24.

When the stopper 211 is removed, an opening is formed on a rear face of the base platform 2 and the guide groove 21 can accommodate the front guided member 12 and the rear guided member 13 from the opening. Along the guide groove 21, the front guided member 12 and the rear guided member 13 can slidably move. After installation of the front guided member 12 and the rear guided member 13, the stopper 211 is fitted in the opening. The guide groove 21 is a groove having a section in a shape of reversed T. When seen from above, the whole guide groove 21 is nearly in a shape of Y.

The guide groove 21 comprises a straight portion 21s, curved portions 21l, 21r. The curved portion 21l, 21r is connected to a front end of the straight portion 21s to formed substantially Y-shaped guide groove 21. The straight portion 21s extends in a moving direction (i.e., front-rear direction) of the vehicle, in the parallel portion 25. The curved portions 21l, 21r are curved parts in the tapered portion 24. The curved portions 21l, 21r guide the child seat body 1 to turn to a substantially lateral direction relative to a moving direction of the vehicle on a horizontal plane.

The male engagement parts 22 are fitted into the respective female engagement parts 31 (anchorage) of the vehicle seat 3, which fastens the base platform 2 to the vehicle seat 3. The male engagement parts 22 and the female engagement parts 31 may be made based on "ISO-FIX" standard, which is the international standard by ISO (International Organization for Standardization) that has standardized on a method to secure child seat.

In the description above, the front guided member 12 and the rear guided member 13 are provided on the child seat body 1. However, they may be provided on the base platform 2 separately from the child seat body 1, and may be connected with the child seat body 1 later with nuts and the like.

The lock member 26 comprises two members. In a state where the lock release button 23 is not pushed (hereinafter, this state is simply referred to as "normal state"), the lock member 26 allows the front guided member 12 (or the rear guided member 13) to move forward but does not allow the front guided member 12 (or the rear guided member 13) to move backward.

The lock member 27 comprises two members. In a normal state, the lock member 27 allows the front guided member 12 to move forward and does not allow the front guided member 12 to move backward, like the lock member 26.

Likewise, the lock member 28 comprises two members, and in a normal state, the lock member 28 allows the front guided member 12 (the rear guided member 13) to move backward but does not allow the front guided member 12 (the rear guided member 13) to move forward.

When the lock release button 23 is pushed, all lock members 26-28 are opened (unlocked). In other words, when the front guided member 12 or the rear guided member 13 is locked by them, pushing the lock release button 23 releases the locked members.

Thickness of the parallel portion 25 is constant, so that an inclination of a sitting part of the child seat body 1 becomes the same as an inclination of a sitting part of the vehicle seat 3 (vehicle seat generally inclines towards rear).

On the other hand, the tapered portion 24 inclines to a forward bottom, in such a manner that the thickness gradually decreases towards the front away from the parallel portion 25. With this configuration, when the child seat body 1 has turned to a lateral direction relative to a moving direction of the vehicle, the sitting part of the child seat body 1 becomes horizontal (i.e., the turned child seat body 1 does not incline towards rear), and it becomes easy to put an infant on and get him/her out of the child seat body 1. The inclination of the tapered portion 24 may be realized not by decreased thickness, but by the same thickness as that of the parallel portion 25 in such a manner that the front portion bends downward when seen from a lateral side.

Figure 3:
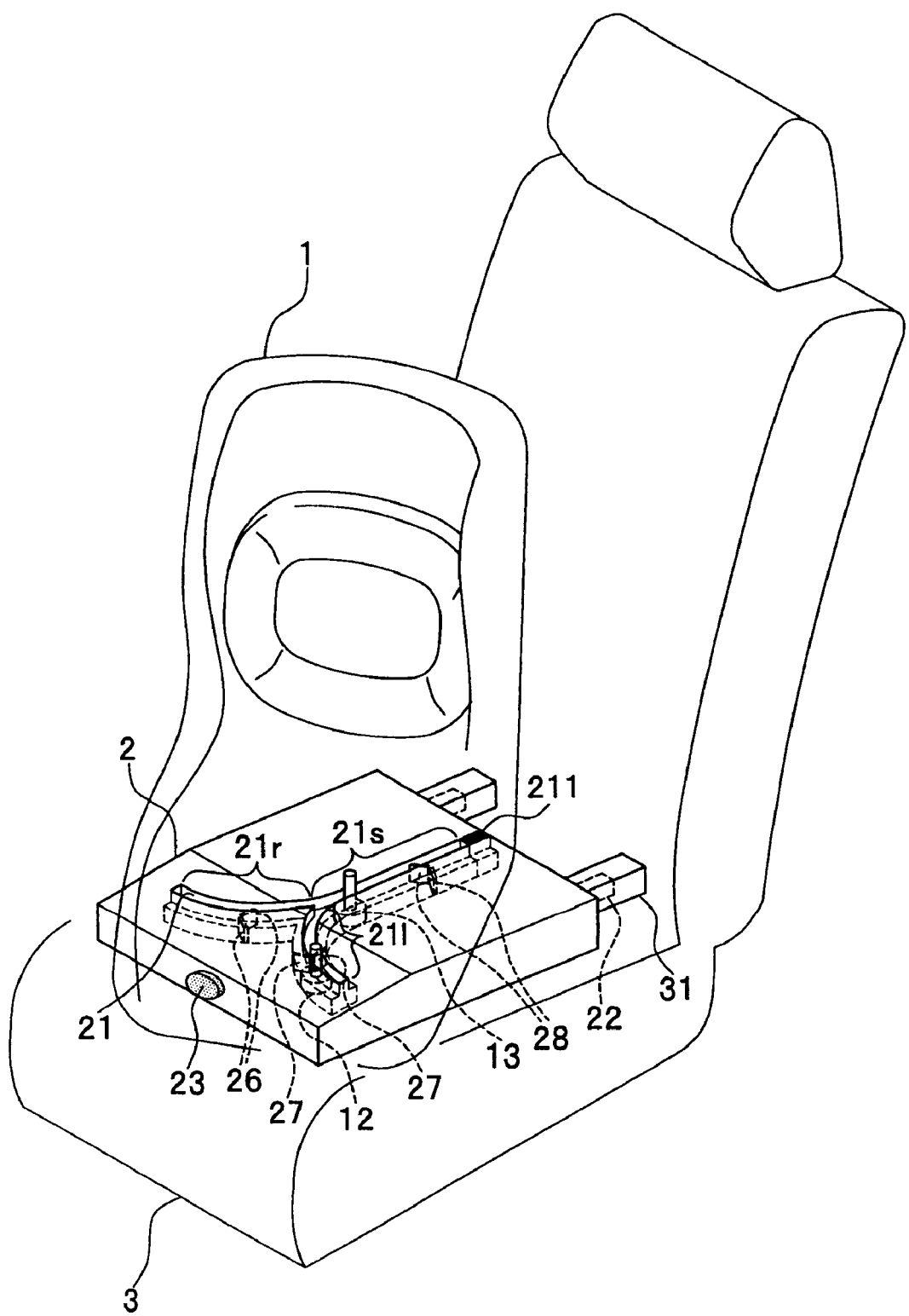
FIG. 3 is a structural perspective view showing the child seat which is turning.
Figure 4:
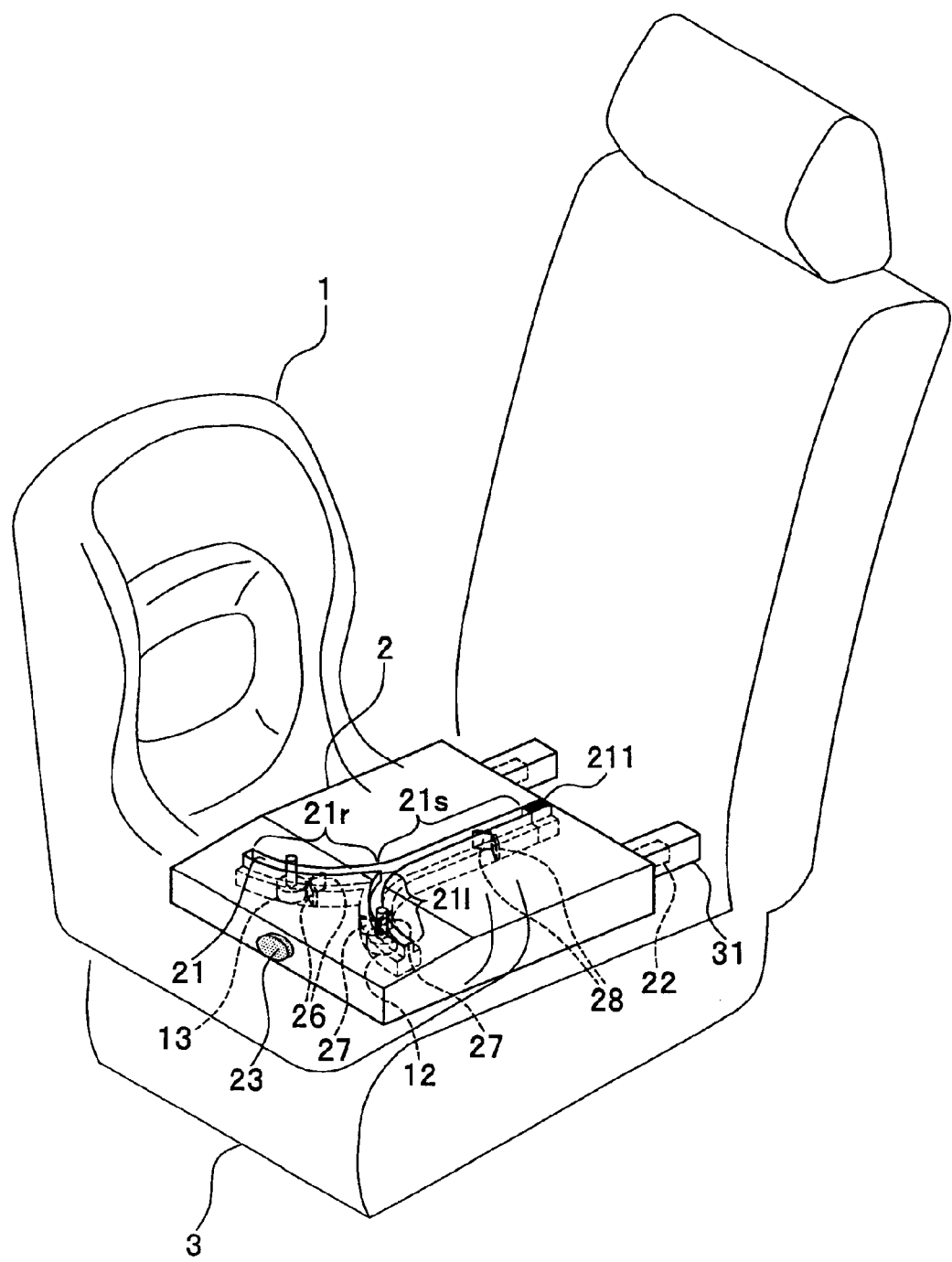
FIG. 4 is a structural perspective view showing the child seat after a turn.

Next, a state in which the above-mentioned child seat is placed on the vehicle seat 3 will be described. Each of FIGS. 2-4 is a structural perspective view showing the state in which the child seat is placed on the vehicle seat.

Figure 2:
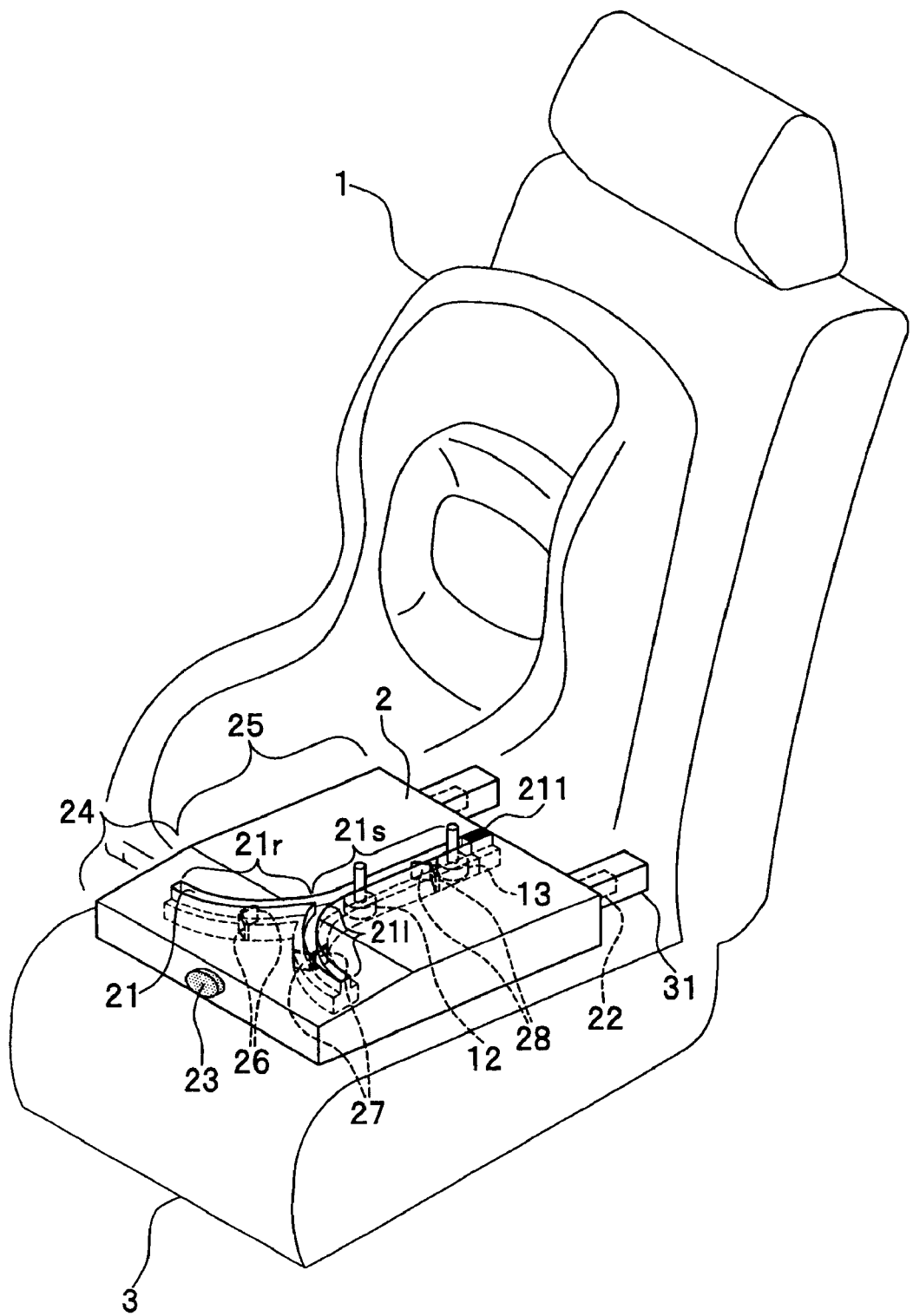
FIG. 2 is a structural perspective view showing the child seat before a turn.

As shown in FIG. 2, the rear guided member 13 of the child seat body 1 is fixed by the lock member 28 of the base platform 2. This state is desirable, when the vehicle is running.

When the vehicle is not running, in the state in FIG. 2, a person excluding an infant, such as an adult (hereinafter simply referred to "user") pushes the lock release button 23. Then a lock of the rear guided member 13 by the lock member 28 is released, and the child seat body 1 becomes movable. The child seat body 1 moves forward when a user applies a force on the child seat body 1 in a forward direction.

When a door (not shown) of the vehicle is positioned on the left side (right hand in the drawing), a user applies a force on the child seat body 1 so that the front guided member 12 of the child seat body 1 moves to the (first) curved portion 21l from the straight portion 21s. Then the front guided member 12 passes the lock member 27 (see FIG. 3).

Subsequently a user applies a force on the child seat body 1 so that the rear guided member 13 of the child seat body 1 moves to the (second) curved portion 21r from the straight portion 21s. Then the rear guided member 13 passes the lock member 26, the child seat body 1 makes a 90-degree turn in comparison with a state of FIG. 2 (in other words, faces the left door) (see FIG. 4).

A user can put an infant on and get him/her out of the child seat body 1 in a state shown in FIG. 4. This seat position remarkably enhances accessibility to the sitting part and the infant by the user, and therefore the user can easily work on the child seat body 1 without inconvenience or discomfort, in comparison with the case of a state that is shown in FIG. 2. In addition, the child seat CS hardly breaks down because the child seat CS does not include a special member for turning horizontally and is simply constituted.

When a user wants to return the child seat body 1 to a position shown in FIG. 2 (for example, after an infant has been put on the child seat body 1), a user pushes the lock release button 23. Then the front guided member 12 and the rear guided member 13 are released from the lock member 27 and the lock member 26, respectively, and the child seat body 1 can return to a state shown in FIG. 2 through the action that is reverse to the above. The inclination of the base platform 2 also helps the child seat body 1 to slide back to a state shown in FIG. 2. The child seat body 1 is secured (in other words, the child seat body 1 does not slide while the vehicle is running) because the rear guided member 13 is fixed by the lock member 28 again.

As described above, in the child seat CS of the first embodiment, the child seat body 1 can turn to a lateral direction relative to a moving direction of the vehicle stably, due to the simple structure of the guide groove 21 of the base platform 2, the front guided member 12 and the rear guided member 13 of the child seat body 1.

In addition, the child seat body 1 can be fixed with the child seat body 1 facing ahead in a moving direction of the vehicle when the vehicle is running, due to the structure of the straight portion 21s of the guide groove 21 in the base platform 2, and fixation of the rear guided member 13 by the lock member 28 in the base platform 2.

In addition, even though the sitting part of the vehicle seat 3 inclines, the child seat body 1 that turns to a lateral direction relative to a moving direction of the vehicle can be maintained horizontal due to an inclination of the tapered portion 24 of the base platform 2.

A similar explanation can be made with respect to a case where there is a door on the right side, and the child seat body 1 can turn to face the right. In other words, the child seat CS of the first embodiment can be used on both right and left side of the vehicle.

Figure 7:
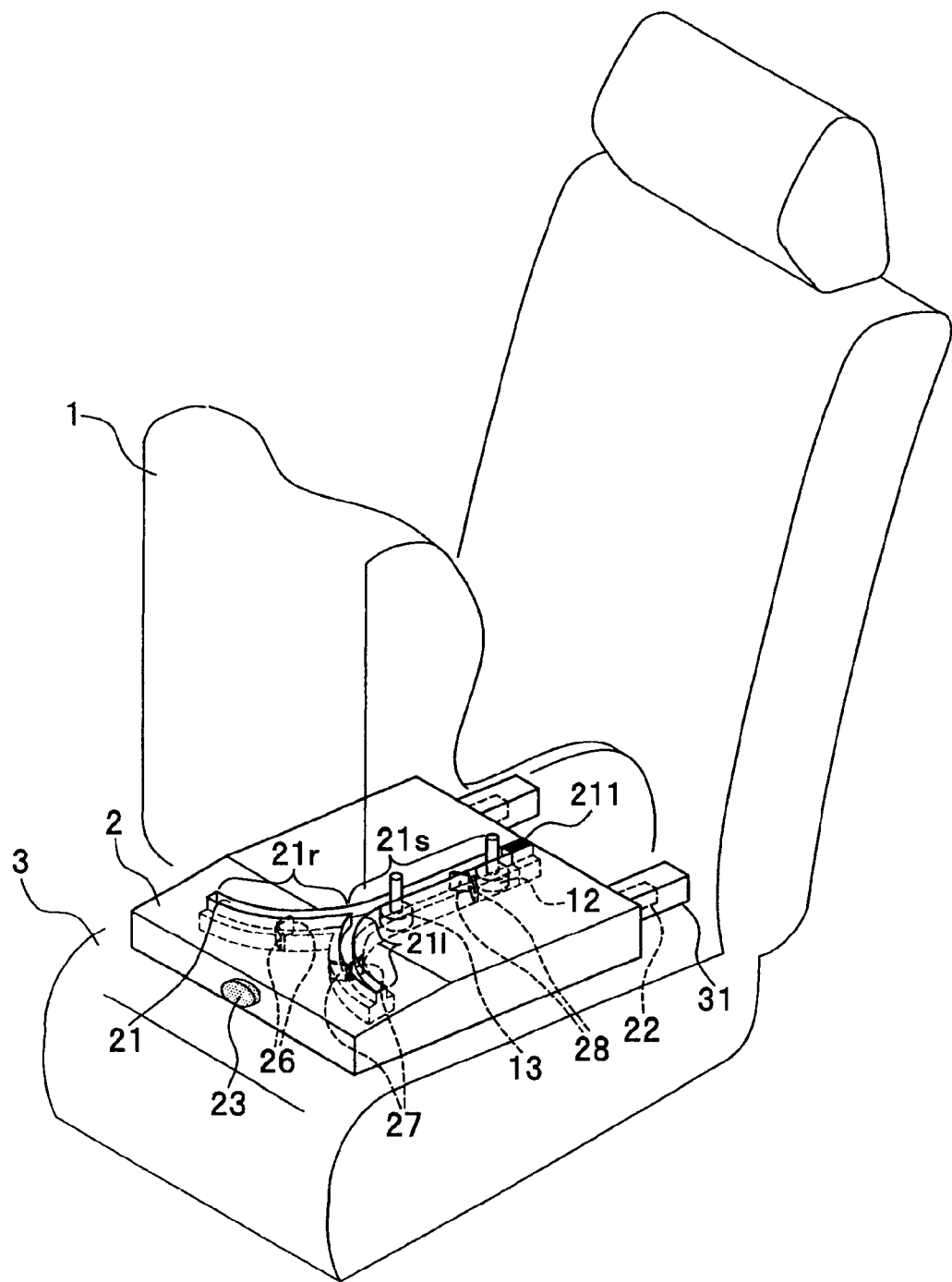
FIG. 7 is a structural perspective view showing an entire configuration including a child seat according to a fourth embodiment.

A user can turn 90-degree so as to have the child seat body 1 facing backward as shown in FIG. 7 from a state of a lateral direction as shown in FIG. 4. In the FIG. 7, the child seat body 1 is fixed facing backward relative to a moving direction of the vehicle. To be specific, in a state of FIG. 4, when the lock release button 23 is pushed, the front guided member 12 and the rear guided member 13 are released from the lock member 27 and the lock member 26, respectively. Then, if the user makes the front guided member 12 move into the straight portion 21*s* firstly and has the rear guided member 13 into the straight portion 21*s* secondly, as a result the child seat body 1 turns backward as shown in FIG. 7. The lock member 28 can lock the front guided member 12 like the rear guided member 13 as shown in FIG. 2.

Second Embodiment

Figure 5:
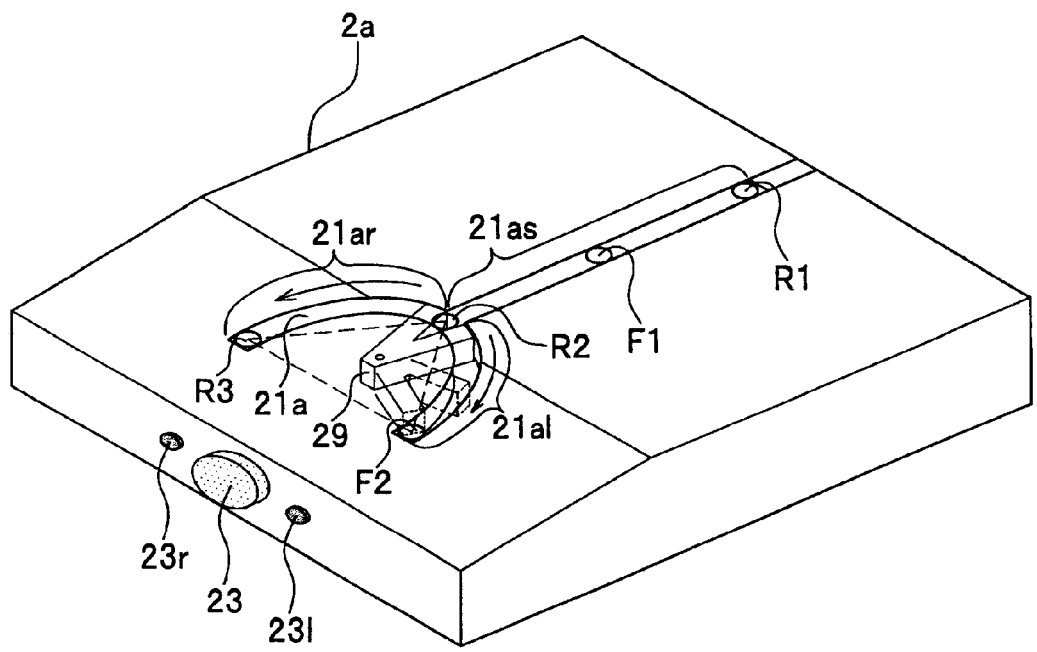
FIG. 5 is a structural perspective view showing a base platform of a child seat according to a second embodiment.

The child seat CS (hereinafter, "CS" is omitted) in the second embodiment will be described below with reference to FIG. 5. FIG. 5 is a structural perspective view showing a base platform of a child seat according to a second embodiment. In the figure, the child seat body 1 and the vehicle seat 3 are not shown, because they are similar to those of the first embodiment.

In comparison with the base platform 2 of the first embodiment, as for the base platform 2*a*, the same reference character is given to the same component, and thus a duplicate description is omitted. In addition, in FIG. 5, the male engagement part 22 and the locking mechanism which is similar to the lock member 26-28 are not shown.

As shown in FIG. 5, in the base platform 2*a*, a shape of a curved portion of the guide groove 21*a* is different from that of the guide groove 21 of the first embodiment. A curved portion divided into two ways at a spot "R2" is formed of a part of the circle having a center as a spot "F2" (guide groove 21*ar*) and a part of the circle having a center as a spot "R3" (guide groove 21*al*). In other words, "R2", "R3" and "F2" form an equilateral triangle.

The base platform 2*a* comprises a rotary direction regulation member 29, a right turn button 23*r* and a left turn button 23*l*. When the right turn button 23*r* is pushed, the rotary direction regulation member 29 is allowed to rotate counterclockwise only. When the left turn button 23*l* is pushed, the rotary direction regulation member 29 is allowed to rotate clockwise only.

With the base platform 2*a*, when a user wants the child seat body 1 in the position that is similar to FIG. 2 make a 90-degree turn to face the left (right hand in the drawing) like in the first embodiment, at first a user pushes the left turn button 23*l*. And a user applies a force on the child seat body 1. Then the front guided member 12 of the child seat body 1 moves to the position "F2" from the position "F1" because only a clockwise turn is permitted in the rotary direction regulation member 29. And the rear guided member 13 moves to the position "R3" via the position "R2" from the position "R1". While the rear guided member 13 moves along the guide groove 21*ar*, the front guided member 12 is kept at the position "F2". Turn in the opposite direction of the child seat body 1 can be realized in a similar manner.

As described above, according to the child seat in the second embodiment, the child seat body 1 can turn to a lateral direction relative to a moving direction of the vehicle in simple movement. In addition, there is no need for the user to consider the direction of a force to be applied on the child seat body 1, because the direction of the child seat body 1 to turn is determined in advance by the left turn button 23*l* or the right turn button 23*r* and the rotary direction regulation member 29.

Third Embodiment

Figure 6:
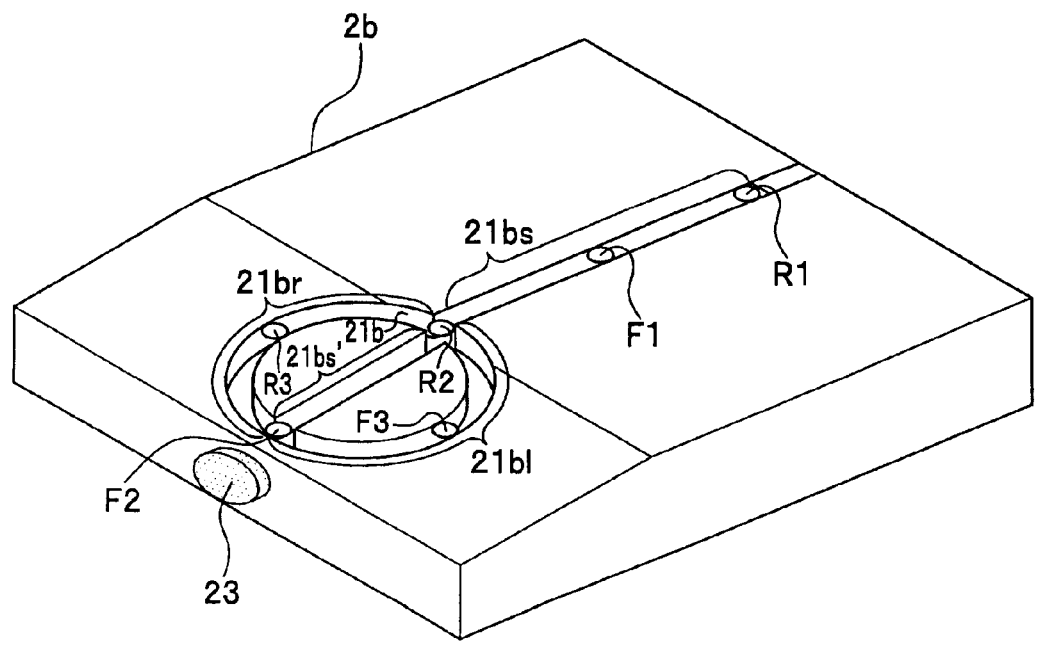
FIG. 6 is a structural perspective view showing a base platform of a child seat according to a third embodiment.

The child seat according to the third embodiment will be described below with reference to FIG. 6. FIG. 6 is a structural perspective view showing a base platform of a child seat according to a third embodiment. In FIG. 6, the child seat body 1 and the vehicle seat 3 are not shown, because they are similar to those of the first embodiment.

In comparison with the base platform 2 of the first embodiment, as for the base platform 2*b*, the same reference character is given to the same component, and thus a duplicate description is omitted. In addition, in FIG. 6, the male engagement part 22 and the locking mechanism which is similar to the lock member 26-28 are not shown.

As shown in FIG. 6, in the base platform 2*b*, a curved portion of a guide groove 21*b* includes a circle (curved portion 21*bl*, 21*br*) and a straight portion 21*bs'* which is extended from a straight portion 21*bs* of the guide groove 21*b*, and serves as a diameter of the circle.

With the base platform 2*b*, in order to turn the child seat body 1 to face the left (right hand in the drawing) like the case in the first embodiment, at first a user applies a force on the child seat body 1 forward. Then the front guided member 12 of the child seat body 1 moves to a position "F2" from a position "F1", the rear guided member 13 moves to a position "R2" from a position "R1".

Subsequently a user applies a force on the child seat body 1 so that the child seat body 1 turns counterclockwise. Then the front guided member 12 of the child seat body 1 moves to a position "F3" from a position "F2", the rear guided member 13 moves to a position "R3" from the position "R2".

A locking mechanism (same as the lock member 26, 27) may be installed in the place where the child seat body 1 stays at the position after making a 90-degree turn. Turning in the opposite direction of the child seat body 1 can be realized in a similar manner.

As described above, according to the child seat in the third embodiment, the child seat body 1 can turn to a lateral direction relative to a moving direction of the vehicle in simple and smooth movement. In addition, the child seat body 1 can turn more than 90 degrees, if a locking mechanism is not installed, or if a locking mechanism is installed at other appropriate positions.

Fourth Embodiment

The child seat according to the fourth embodiment will be described below with reference to FIG. 7. FIG. 7 is a structural perspective view showing an entire configuration including a child seat according to a fourth embodiment. In FIG. 7, all component and configuration are the same as those of the first embodiment, except that the child seat body 1 is facing backward.

AS shown in FIG. 7, even if the child seat body 1 is installed facing backward on the base platform 2, the child seat body 1 can turn, because the front guided member 12 and the rear guided member 13 can slide along the guide groove 21, in the same manner as in the first embodiment.

As described above, in the child seat in the fourth embodiment, the child seat body 1 can be fixed facing backward relative to a moving direction of the vehicle. And the child seat body 1 fixed facing backward can turn to a lateral direction relative to a moving direction of the vehicle.

A user can turn 90-degree so as to have the child seat body 1 facing forward as shown in FIG. 2 from a state of a lateral direction as shown in FIG. 4. To be specific, in a state of FIG. 4, when the lock release button 23 is pushed, the front guided member 12 and the rear guided member 13 are released from the lock member 27 and the lock member 26, respectively. Then, if the user makes move the rear guided member 13 into the straight portion 21s firstly and has the front guided member 12 into the straight portion 21s secondly, as a result the child seat body 1 turns forward as shown in FIG. 2.

Fifth Embodiment

Figure 8A:
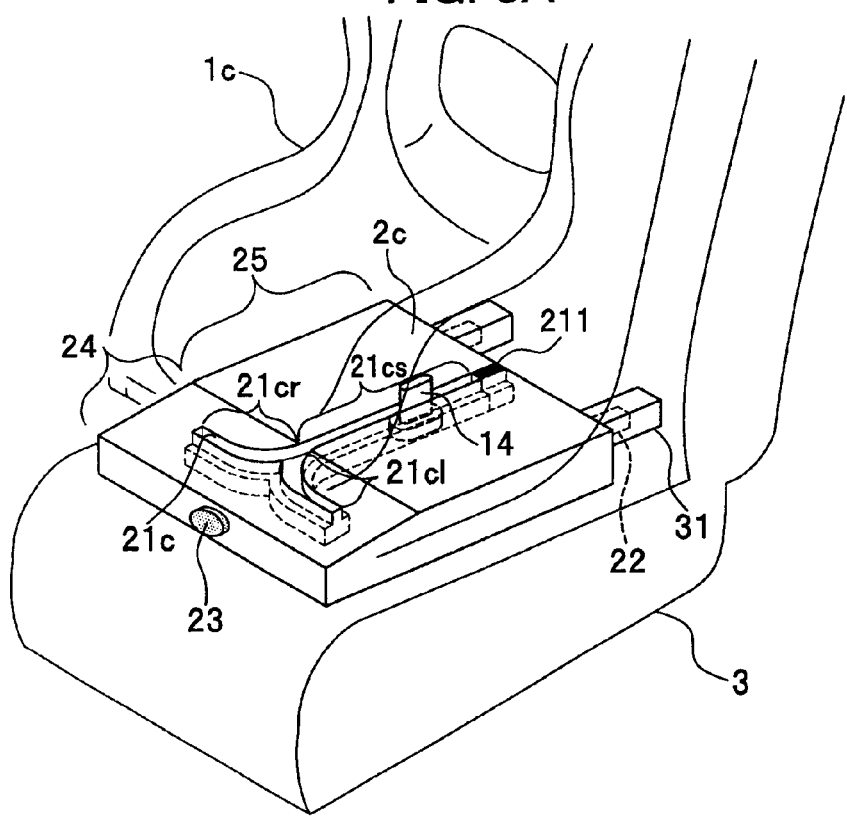
FIG. 8A is a structural perspective view showing an entire configuration including a child seat according to a fifth embodiment that faces in a moving direction of a vehicle.
Figure 8B:
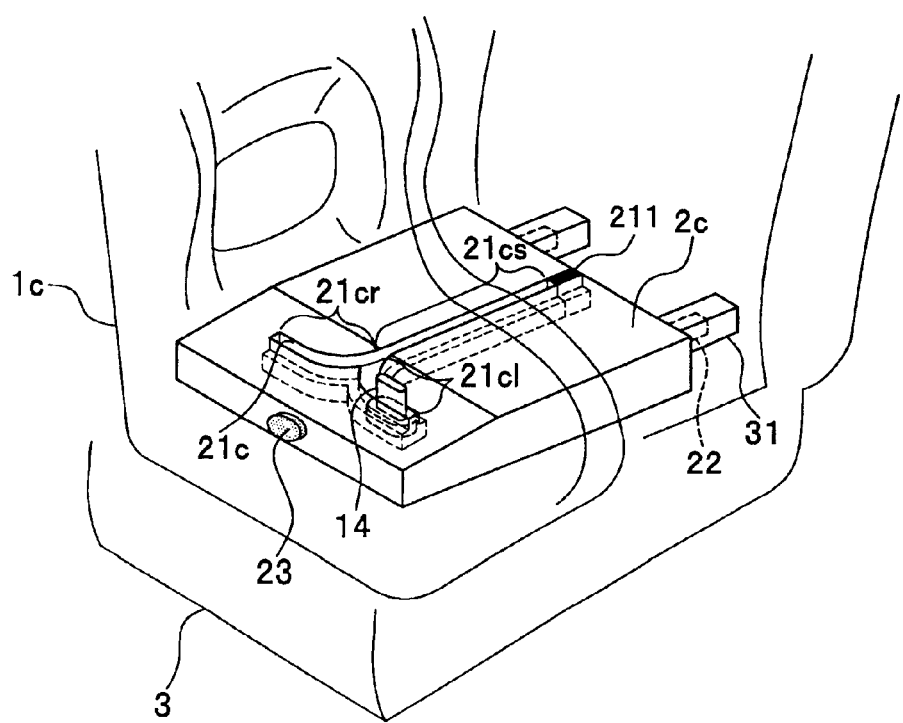
FIG. 8B is a structural perspective view showing an entire configuration including a child seat according to a fifth embodiment that turns to a lateral direction relative to a moving direction of a vehicle.

The child seat in the fifth embodiment will be described below with reference to FIGS. 8A, 8B. FIG. 8A is a structural perspective view showing an entire configuration including a child seat according to a fifth embodiment that faces in a moving direction of the vehicle. FIG. 8B is a structural perspective view showing an entire configuration including a child seat according to a fifth embodiment that turns to a lateral direction relative to a moving direction of the vehicle.

In comparison with FIG. 1, the same reference character is given to the same component, and thus a duplicate description is omitted. In addition, in FIG. 8, the locking mechanism which is similar to the lock member 26-28 are not shown.

As shown in FIG. 8A, a child seat body 1c is different from the child seat body 1 in the first embodiment in that only a single guided member 14 is used instead of two. The guided member 14 has the structure that is similar to the front guided member 12 (and the rear guided member 13) except that it has an oblong structure to improve durability and stability.

The child seat body 1c can turn to a left direction relative to a moving direction of the vehicle (right hand in the drawing) like in the first embodiment (see FIG. 8B). In other words, by moving the guided member 14 to the curved portion 21cl from the straight portion 21cs, the child seat body 1c turns to the left. The opposite turn of the child seat body 1c can be realized in a similar manner.

Although the embodiments of the present invention are described, the invention is not limited to these. For example, the vehicle seat to which the child seat is to be secured may be a passenger seat of a car or a seat of a vehicle other than a car.

An angle of a turn of the child seat may be besides 90 degrees (For example, 60 degrees).

The child seat may be fixed more for the vehicle seat by supportive means such as top tether, besides the fixation for the vehicle seat by the above-mentioned engagement parts.

The base platform may further comprise a spring and the like to bias the child seat body forward.

The child seat body can make a 90-degree turn without a special member, but a special member may be used together.

The base platform may be installed on the vehicle seat by a seat belt of the vehicle seat, instead of the above-mentioned engagement parts.

The locking mechanism for the child seat body is not limited to the above-mentioned mechanism. If safety of an infant on the child seat body is secured, a part or all of the locking mechanism for the child seat body may be omitted.

The base platform does not need to include the tapered portion. In other words, all of the base platform may be the parallel portion.

The components or the configurations can be appropriately modified without departing the sprit of the present invention.

What is claimed is:

1. A child seat attached to a vehicle seat, comprising:
a child seat body which comprises a bottom face and a guided member which is fixed on the bottom face; and
a base platform that rests on a seating surface of the vehicle seat, the base platform including
a bottom surface that faces the seating surface of the vehicle seat,
a top surface that is opposite the bottom surface and faces the bottom face of the child seat body, said top surface having a guide groove formed therein for sliding engagement with the guide member of the child seat body,
a rear surface that faces a seatback of the vehicle seat,
a front surface that is opposite the rear surface, and
first and second side surfaces that extend between the front surface and the rear surface,
wherein the guide groove comprises a straight groove portion, a first curved groove portion, and a second curved groove portion, the straight groove portion linearly extending from a starting end toward the front surface to stop at a terminating end, the first curved groove portion curvilinearly extending from the terminating end toward the first surface and the second curved groove portion curvilinearly extending from the terminating end toward the second surface, the first and second curved groove portions each including a lock member that in a locked state prevents the guided member from sliding past the respective lock member toward the straight groove portion, wherein the child seat body can turn to a substantially lateral direction relative to a longitudinal direction of a vehicle by the guided member being guided along the first or second curved groove portion.

2. The child seat of claim 1, wherein the straight groove portion is arranged in parallel with the longitudinal direction of the vehicle.

3. The child seat of claim 2, wherein the base platform further comprises a locking mechanism which fixes the guided member of the child seat body, and is located in the straight groove portion of the guide groove.

4. The child seat of claim 3, wherein the locking mechanism fixes the child seat body facing toward or away from the seatback of the vehicle seat.

5. The child seat of claim 1, wherein the base platform has a tapered portion formed in a front portion of the top surface of the base platform relative to the longitudinal direction of the vehicle, which declines downward to the front surface relative to the longitudinal direction of the vehicle.

6. The child seat of claim 1, wherein the first curved groove portion, the second curved groove portion, and the straight groove portion form a substantial Y-shape.

7. The child seat of claim 6, wherein the guided member comprises a front guided member and a rear guided member, both the front and the rear guided members are slidably engaged with the guide groove, the front and the rear guided members respectively slide into the first and the second curved groove portions so that the child seat body turns to the substantially lateral direction of the vehicle.

8. The child seat of claim 1, wherein when the lock members of the first and second curved groove portions are in the locked state, the guided member is able to slide past the respective lock members toward the straight groove portion.

9. The child seat of claim 1, wherein when the lock members of the first and second curved groove portions are in an unlocked state, the guided member is able to slide past the respective lock members toward the straight groove portion and also slide past the lock members toward first or second surface.

10. The child seat of claim 3, wherein when the locking mechanism of the straight groove portion is in a locked state, the guided member is free to move toward the rear surface, but prevented from moving past the locking mechanism toward the front surface.

11. The child seat of claim 3, wherein when the locking mechanism of the straight groove portion is in an unlocked state, the guided member is free to move past the locking mechanism toward the rear surface and the front surface.

* * * * *